United States Patent [19]
Nomura

[11] Patent Number: 4,745,589
[45] Date of Patent: May 17, 1988

[54] OBJECTIVE LENS ACTUATOR HAVING MOVEMENTS RESTRICTING CONTROL MEANS FOR AN OPTICAL HEAD

[75] Inventor: Hiroaki Nomura, Nagano, Japan

[73] Assignee: Seiko Epson Kabushiki Kaisha, Tokyo, Japan

[21] Appl. No.: 784,916

[22] Filed: Oct. 4, 1985

[30] Foreign Application Priority Data

Oct. 4, 1984 [JP] Japan .................................. 59-208914
Nov. 22, 1984 [JP] Japan .................................. 59-247721

[51] Int. Cl.$^4$ .......................... G11B 7/095; G11B 7/12
[52] U.S. Cl. ......................................... 369/45; 369/44; 369/46; 350/247; 350/255
[58] Field of Search ............................ 369/45, 44, 46; 350/247, 255; 250/201 DF

[56] References Cited

U.S. PATENT DOCUMENTS

| | | | |
|---|---|---|---|
| 4,507,765 | 3/1985 | Suzuki et al. | 369/45 |
| 4,511,212 | 4/1985 | Tanaka | 350/255 |
| 4,514,039 | 4/1985 | Kawai | 350/255 |
| 4,547,871 | 10/1985 | Sugiyaina et al. | 369/45 |
| 4,553,227 | 11/1985 | Kido et al. | 369/45 |
| 4,555,780 | 11/1985 | Koide | 369/45 |
| 4,566,089 | 1/1986 | Kime | 369/45 |
| 4,568,142 | 2/1986 | Iguma | 369/45 |
| 4,596,444 | 6/1986 | Ushida | 350/247 |
| 4,613,202 | 9/1986 | Kuriyama | 369/45 |
| 4,616,355 | 10/1986 | Kasahara | 369/45 |
| 4,646,283 | 2/1987 | Ito et al. | 350/247 |
| 4,658,390 | 4/1987 | Fujii et al. | 369/45 |

FOREIGN PATENT DOCUMENTS

56-119944 9/1981 Japan ................................... 369/45
57-198548 12/1982 Japan ................................... 369/45

*Primary Examiner*—Raymond F. Cardillo
*Assistant Examiner*—Hoa T. Nguyen
*Attorney, Agent, or Firm*—Blum Kaplan

[57] ABSTRACT

An objective lens actuator for an optical head. The objective lens has an optical axis. A first movable portion is adapted to move the objective lens in the focusing direction along the optical axis. The first movable portion includes an objective lens holder with a piston projecting from the objective lens in the direction of the optical axis. The objective lens holder secures the objective lens on the optical axis and supports a rectangular focusing coil and a four component tracking coil. A second movable portion is adapted to move the objective lens in a tracking direction, essentially perpendicular to the focusing direction and includes a guide hole shaped to slidably receive the first movable portion therein and to restrict movement of the first movable portion relative to the second movable portion to motion substantially along the focusing direction. A magnetic circuit drives the first and second movable portions in the focusing and tracking directions, respectively. The magnetic circuit includes two essentially parallel gaps, portions of the focusing and tracking coils being located in the gaps. Respective currents in the focusing and tracking coils cause the first and second movable portions to be urged in the focusing and tracking directions.

49 Claims, 7 Drawing Sheets

OBJECTIVE LENS ACTUATOR HAVING MOVEMENTS RESTRICTING CONTROL MEANS FOR AN OPTICAL HEAD

BACKGROUND OF THE INVENTION

The invention is generally directed to an optical head for an optical memory device utilizing an optical disk and in particular to a driving mechanism for an objective lens actuator which forms the front portion of an optical head.

Reference is made to FIGS. 1 and 2 wherein an example of an objective lens actuator constructed in accordance with the prior art is depicted. The actuator includes a shaft 1 fixed on a magnetic yoke 2. An annular cylindrical member 3 is formed on yoke 2 around shaft 1. Element 4 is a magnet arranged atop the perimeter of yoke 2. Annular yoke 5 is mounted on top of magnet 4. A bobbin 6 made of a non-magnetic material is sized so as to slide vertically along shaft 1 and to rotate around shaft 1. Bobbin 6 has a focusing coil 7 wound about its outside surface in the manner of a standard speaker coil. In addition, a tracking coil 8 is wound about bobbin 6 and focusing coil 7 in a frame-like form as seen clearly in FIG. 2. Tracking coil 8 is mounted mechanically to bobbin 6 in one piece with focusing coil 7. Tracking coil 8 is provided with four components distributed circumferentially about bobbin 6.

Annular yoke 5 has two cutaway portions 5a so that only one of the two vertical legs of each of the four frame-like coils 8 is positioned between annular yoke 5 and bobbin 6. This produces an electro-magnetic effect which results from only one of each of the two vertical legs of the four frame-like components of tracking coil 8. The transmitted light path 3a, 6a of the optical beam moves through objective lens 9. Contact wires 7a and 8a are the contacts for introducing current into focusing coil 7 and tracking coil 8, respectively.

In accordance with the above-described structure a magnetic circuit $\phi$ is formed by magnet 4 (FIG. 1). As a result when current flows through focusing coil 7, focusing coil 7 and bobbin 6 move upward or downward depending upon the direction of the current. The distance of movement of bobbin 6 is dependent upon the magnitude of current present in focusing coil 7. As a result, the laser light passing through objective lens 9 is accurately focused on the optical disk (not shown). The optical disk would be above objective lens 9.

When a current is applied to tracking coil 8 a force to rotate bobbin 6 around shaft 1 is produced, the direction of rotation depending upon the direction of current through tracking coil 8. The rotation of bobbin 6 causes objective lens 9, which is near the perimeter of bobbin 6, to rotate about an arc, where the radius is the distance between shaft 1 and objective lens 9. As a result, over small arcs of rotation the movement of objective lens 9 is approximately linear.

Objective lens actuators constructed in accordance with the prior art utilize objective lenses which rotate about an axis in the center of the actuator. As a result, the diameter of the actuator unit as a whole inevitably becomes large to minimize the non-linearity of movement of the objective lens. Consequently, it is difficult to reduce the size of the optical head.

This conventional objective lens actuator is not suitable for a small-sized optical head. If the size of the optical head is forced to be scaled down to a smaller size, the radius of the arc of rotation through which the lens rotates is also reduced. As a result, the range in which the movement of the lens in the tracking direction can be regarded as linear is limited and, outside of this range, the variation of the optical axis of the light reflected by the optical disk increases. As a result, accurate servo-control is not realized. This results in a reduction in the range in which the optical head can follow fluctuations in the track. Accordingly, there is a need for a small, thin actuator in which the optical head tracking range is wide without non-linearities or increases in the variation of the optical axis of the light reflected by the optical disk.

SUMMARY OF THE INVENTION

The invention is generally directed to an objective lens actuator for an optical head where the objective lens has an optical axis. The actuator includes a first movable portion adapted to move the objective lens in a focusing direction along the optical axis, the first movable portion including a downwardly projecting cylindrical piston proximate to the center of the first movable portion and adapted to hold the objective lens. A second movable portion, adapted to move the objective lens in a tracking direction, perpendicular to the focusing direction, includes a cylindrical guide hole sized to slidably receive a cylindrical piston therein. A magnetic circuit assembly drives the first and second movable portions in the focusing and tracking directions, respectively and includes two essentially parallel gaps. A substantially rectangular focusing coil is wound about the periphery of the first movable portion. Four tracking coils are formed on the respective corners of the focusing coil. Portions of the focusing and tracking coils are located in the gaps in the magnetic circuit. As a result, a crossed bi-axial linear motor is formed and the objective lens may be moved in both the focusing and tracking directions controlled by the direction and magnitude of current flowing through the focusing and tracking coils.

Accordingly, it is an object of the instant invention to provide an improved objective lens actuator for an optical head.

Another object of the invention is to provide a small and thin objective lens actuator which provides a broad tracking range without affecting the variation in optical angle of the reflected light.

A further object of the invention is to provide an objective lens actuator having a first movable portion for moving the objective lens parallel to the direction of the optical axis, a second movable portion for moving the objective lens in the direction of the radius of the optical disk and magnetic circuits for driving the first and second movable portions.

Still a further object of the invention is to provide an improved objective lens actuator utilizing guide bars and bearings to move the objective lens in the tracking direction.

Still another object of the invention is to provide an objective lens actuator which moves the objective lens in the tracking direction by utilizing the rotation of two arms fixed at first ends to diagonal corners of the second movable portion of the actuator and at second ends are fixed to a base.

Yet a further object of the invention is to provide an improved objective lens actuator which utilizes leaf springs to control movement of the objective lens in the tracking direction.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
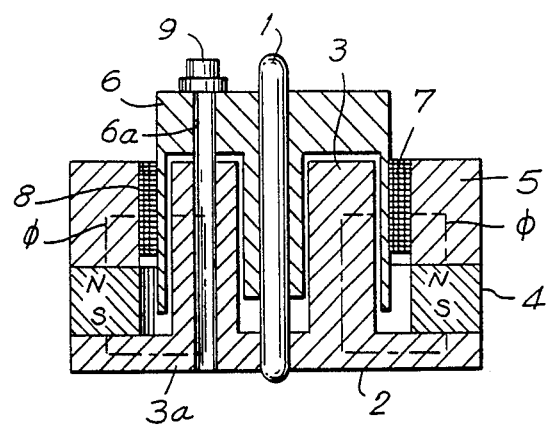
FIG. 1 is cross-sectional view of an objective lens actuator for an optical head constructed in accordance with the prior art.
Figure 2:
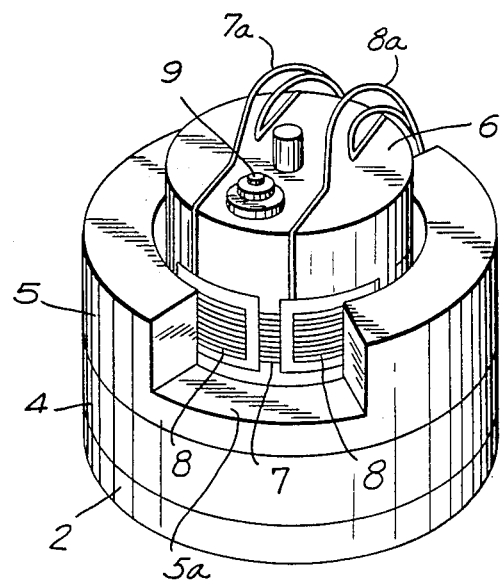
FIG. 2 is a perspective view of the objective lens actuator of FIG. 1.
Figure 3:
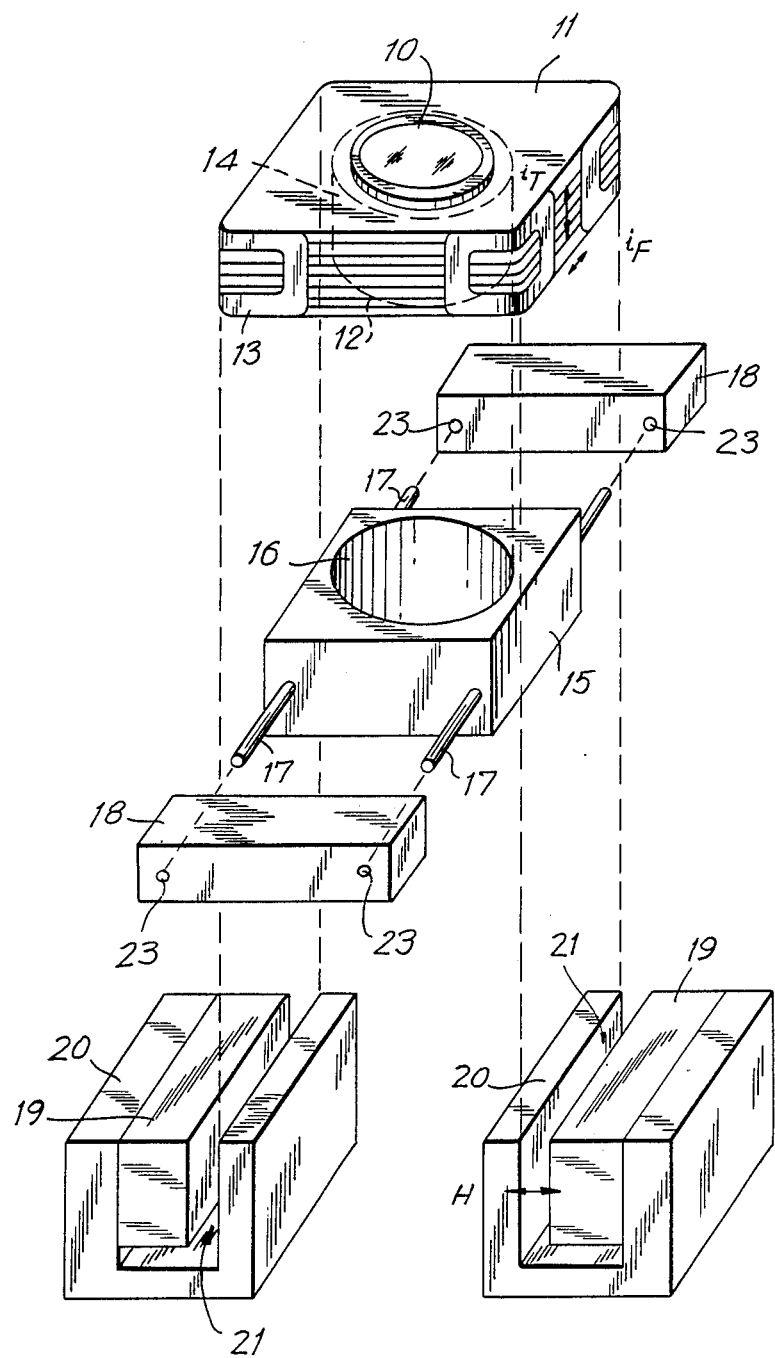
FIG. 3 is an exploded perspective view of an objective lens actuator for an optical head constructed in accordance with the invention.
Figure 4:
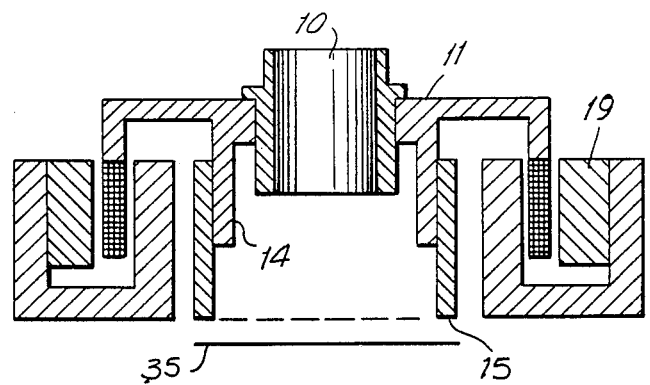
FIG. 4 is a cross-sectional view of the actuator of FIG. 3.
Figure 7:
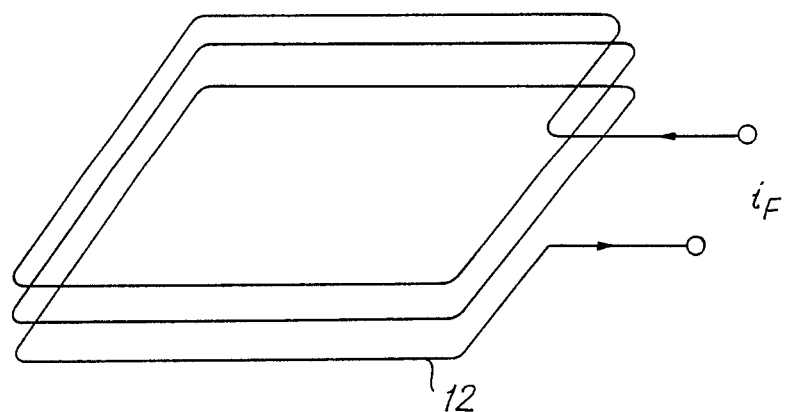
FIG. 7 is a perspective view of the rectangular focusing coil used in the actuator constructed in accordance with the invention.
Figure 8:
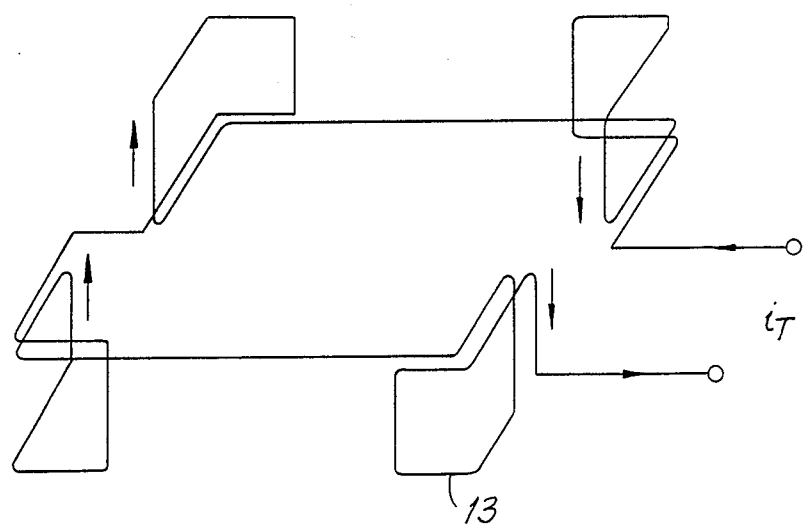
FIG. 8 is a perspective view of the four tracking coils used in the actuator constructed in accordance with the invention.

Reference is made to FIG. 3 wherein an exploded perspective view of an objective lens actuator for an optical head constructed in accordance with the invention is depicted. FIG. 4 is a cross-sectional view of the actuator of FIG. 3. An objective lens 10 is fixed in place by a lens holder 11. A rectangular focusing coil 12 is wound around lens holder 11. Four tracking coils 13 are wound at the four corners of lens holder 14. Tracking coils 13 are fixed onto focusing coil 12. Clearer views of focusing coil 12 and tracking coil 13, with four frame-shaped portions at the corners, are shown in FIGS. 7 and 8. Lens holder 11 includes a cylindrical projection (or piston) 14 integrally formed with lens holder 11. Piston 14 projects downward from lens holder 11 and objective lens 10 (FIGS. 3, 4). Objective lens 10, lens holder 11, piston 14 and coils 12 and 13 form a first movable portion adapted to move the objective lens in a focusing direction. Objective lens 10 has an optical axis extending vertically in FIGS. 3, 4 and movement of the first movable portion is along this optical axis. Laser light is transmitted through objective lens 10 and can be focused by moving objective lens 10 along its optical axis.

A second movable portion 15 has a cylindrical guide hole 16 adapted to receive piston 14. As a result, the first movable portion is restrained from moving in any direction except a vertical direction by the sliding engagement of piston 14 and cylindrical guide hole 16.

Second movable portion 15 has two rods 17 extending through second movable portion 15 in a direction essentially perpendicular to the direction of displacement of first movable portion 10. The tips of rods 17 are inserted into guide holes 23 and bearing pieces 18. Rods 17 are constructed of a non-magnetic metal and fit into bearing pieces 18 preferably constructed of tetra-flouride ethyl-resin (TEFLON). The TEFLON bearings 18 provide for lubricated movement. However, it is also possible to use a lubricant to reduce friction between rods 17 formed of another material and bearings 18.

Tracking coil 13 and focusing coil 12 are inserted into gaps 21 located between permanent magnets 19 and yokes 20. These gaps are situated parallel to two sides of focusing coil 12 and yokes 20.

Yokes 20 and permanent magnets 19 are located so that two parallel sections of focusing coil 12 are located in the gaps 21. In addition, each of the four frame-shaped portions of tracking coil 13 has two vertical legs. Only one of the vertical legs from each of the four frame-shaped portions of frame coil 13 is located in one of gaps 21 in the magnetic field created by permanent magnets 19 and yokes 20. The other legs of each of the four frame-shaped portions of tracking coil 13 are not present in the magnetic field. As a result, it is only the direction of current through the "effective" portion of tracking coil 13 which generates a force for moving the second movable portion. The current in the "ineffective" portions of tracking coil 13 outside of gaps 21 does not generate a force. In FIG. 8 the arrows indicate the direction of current flow $i_T$ through the "effective" portions.

When currents $i_F$ and $i_T$ are supplied to focusing coil 12 and tracking coil 13, respectively, the direction of the current is vertical to the magnetic field H. As a result, in accordance with Flemming's left-hand rule, the focusing and tracking coils create vertical and lateral forces, respectively. The current $i_F$ supplied to focusing coil 12 causes the first movable portion to move upward or downward depending upon the direction of current through focusing coil 12. The magnitude of the current flowing through focusing coil 12 determines the distance which the first movable portion travels. As seen in FIG. 4, the first movable portion is free to move vertically but is restrained from moving in any other direction. Likewise, the introduction of a current $i_T$ into tracking coil 13 causes the second movable portion to slide forward or backward (FIG. 3) along shafts 17 depending upon the direction of the current flow through tracking coil 13.

As a result, the combination of the movements caused by the introduction of current into focusing coil 12 and tracking coil 13 causes the objective lens to be moved into crossed orthogonal directions, thus forming a biaxial actuator. Cylindrical guide 16 and rods 17 and bearing 18 mounted on the second movable portion control the direction of movement of the actuator, thereby maintaining the optical axis of the objective lens substantially constant and level.

The actuator thus includes a first movable portion containing a centrally located objective lens with rectangular focusing coils and tracking coils about the periphery of the first movable portion. The coils are inserted in the gap in the two magnetic circuits which are placed parallel to two of the sides of the rectangular first movable portion. The cylindrical piston provided about the objective lens and projecting downward engages with the cylindrical guide hole mounted on the second movable portion and creates a crossed bi-axial linear motor. The movement of the objective lens along the optical axis and in the tracking direction along the radius of the optical disk are controlled by the magnitude and direction of the current flowing through focusing and tracking coils.

Figure 5:
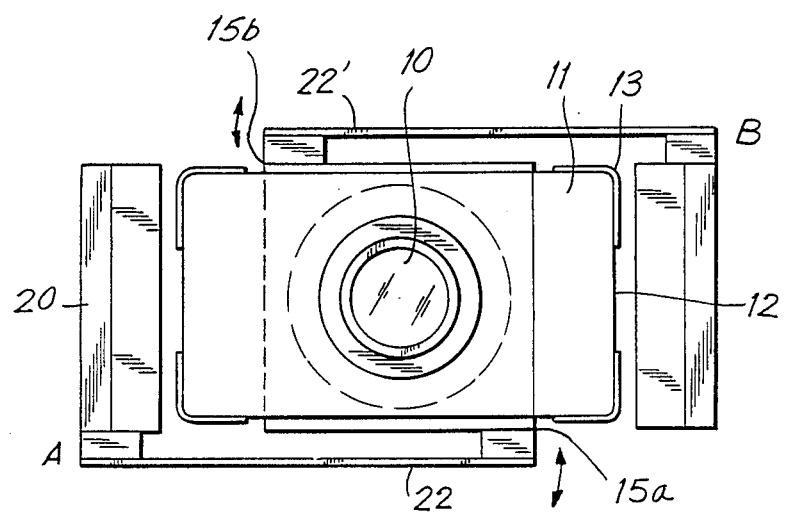
FIG. 5 is a top plan view of an objective lens actuator for an optical head constructed in accordance with a second embodiment of the invention.
Figure 6:
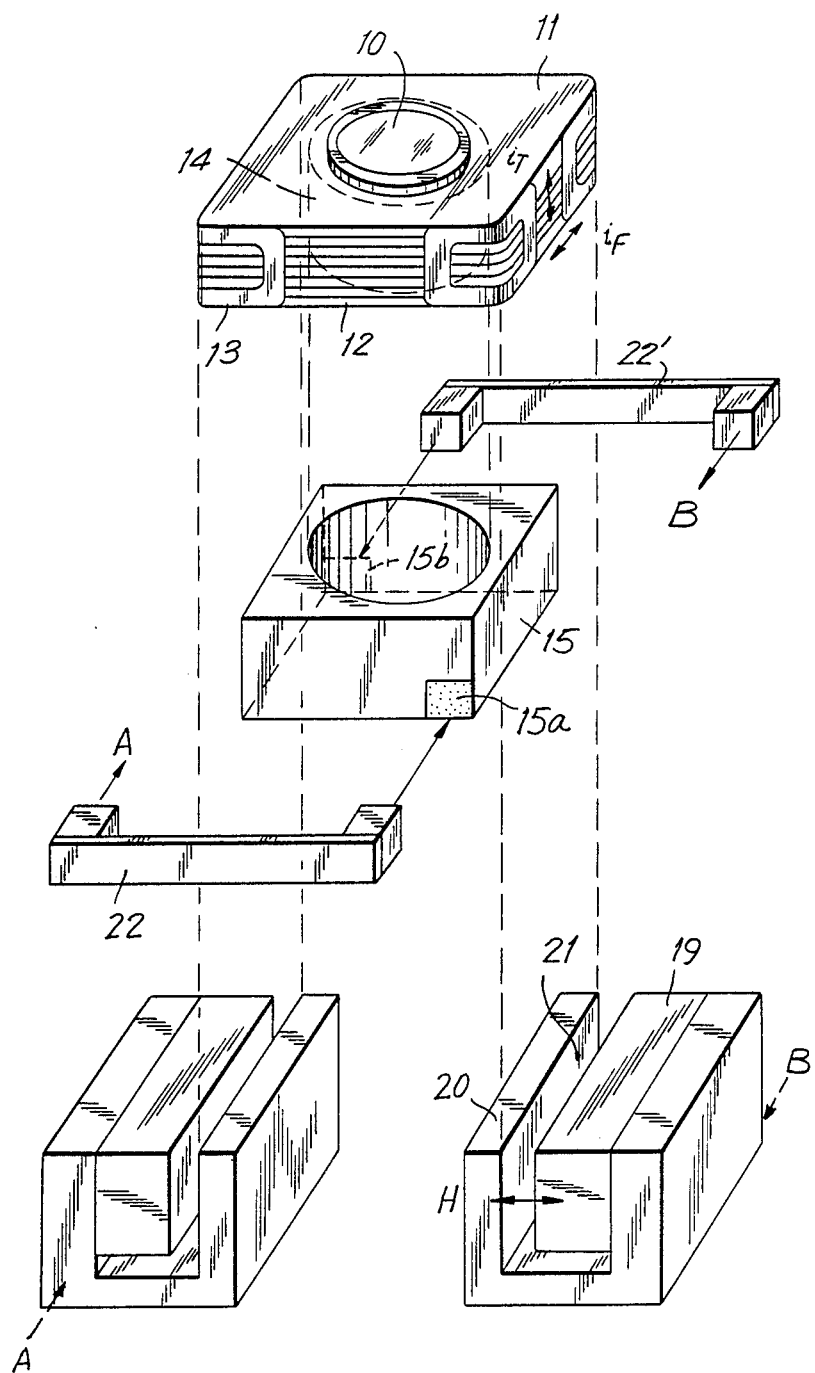
FIG. 6 is an exploded perspective view of the actuator of FIG. 5.

Reference is next made to FIGS. 5 and 6 wherein a plan view and an exploded perspective view of an objective lens actuator for an optical head constructed in accordance with a second embodiment of the invention is depicted. Like reference numerals correspond to like elements. An objective lens 10 is fixed to a lens holder 11 and a focusing coil 12 is wound around lens holder 11. Tracking coils 13 are mounted at four points around lens holder 11. Instead of utilizing shaft 17 and bearings 18 to move the objective lens in the radial or tracking direction, two leaf springs 22, 22' are utilized. First leaf spring 22 has one end mounted to one corner of second movable portion 15 at point 15a on one side thereof and the second end of the leaf spring is fixed to yoke 20 at point A. Second leaf spring 22' is mounted at one end to the corner of second movable portion 15 at point 15b diagonally opposite to point 15a, at the opposite side of second movable portion 15 to which first leaf spring 22 is mounted. The other end of said second leaf spring is fixed to yoke 20 at point B.

As a result, since second movable portion 15 is diagonally secured by leaf springs 22, 22', second movable portion 15 is capable of movement upward or downward (in relation to FIG. 5). However, second movable portion 15 does not move along the optical axis of objective lens 10 (in and out of the page in FIG. 5). Accordingly, the same bi-axial control of motion of the axis is obtained by using the shaft and bearings in the embodiment of FIGS. 3 and 4 is achieved.

In addition, an actuator constructed in accordance with the embodiments of FIGS. 3, 4 and 5, 6 can be reduced in size and thickness so that the size of the optical head as a whole is reduced. In accordance with the invention, an actuator in accordance with the invention which is 25 mm wide, 15 mm deep and 10 mm high has been experimentally produced and the thickness of the entire optical head in which the actuator is used can be reduced to less than 20 mm. Thus, by using an optical head in which the actuator constructed in accordance with the invention is used, an ultra-thin half-height optical memory drive can be realized.

In addition, by providing a total reflecting mirror 35, shown schematically in FIG. 4 under second movable portion 15 and by constructing the actuator so that the mirror moves parallel with the movement of the optical lens in the tracking direction, the passage of the laser light is maintained through the center of the objective lens and a shift in the optical axis is prevented. Thus, an even more improved lens actuator in which the optical load against the objective lens is quite small is provided.

Figure 9:
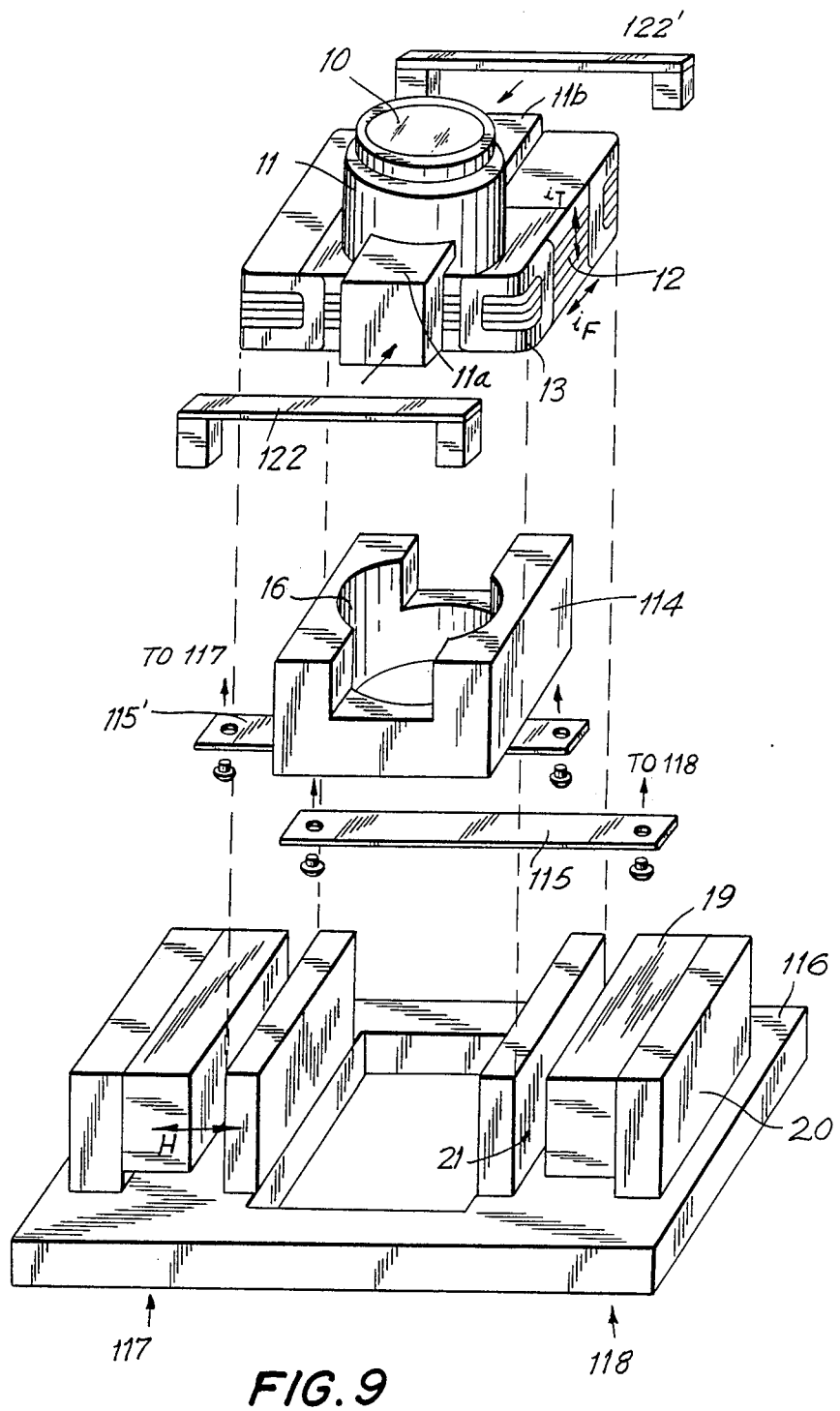
FIG. 9 is an exploded perspective view of an objective lens actuator for an optical head construction in accordance with a third embodiment of the invention.
Figure 10:
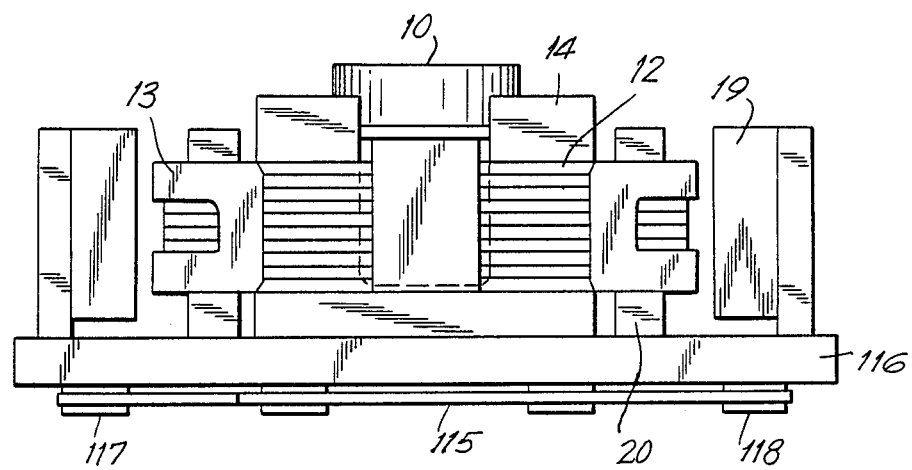
FIG. 10 is a partially cutaway front elevational view of the actuator of FIG. 9.
Figure 11:
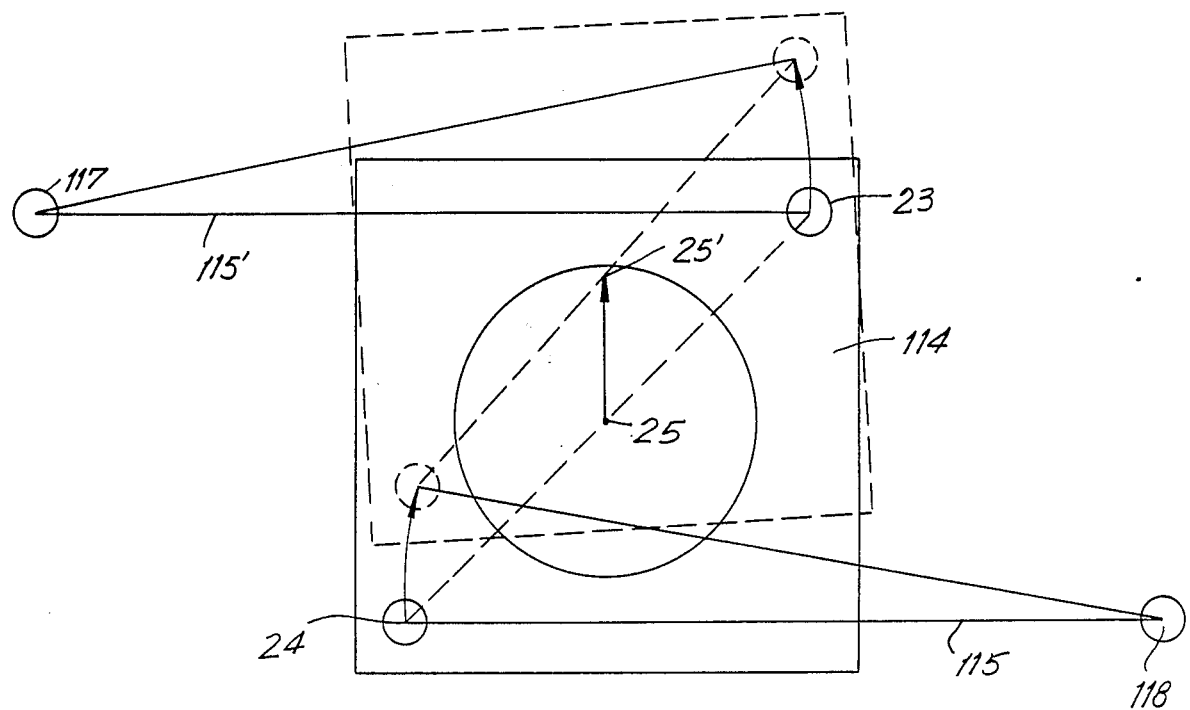
FIG. 11 is a bottom plan view of the actuator of FIG. 9.

Reference is next made to FIGS. 9, 10 and 11 wherein an objective lens actuator constructed in accordance with a third embodiment of the invention is depicted. Lens 10 is secured by a lens holder 11 with arms 11a, 11b extending outward and bonded to the outside of the rectangularly wound focusing coil 12 as shown in FIG. 7. Four tracking coil components 13 are attached at the four corners of focusing coil 12. Objective lens 10, lens holder 11 with arms 11a, 11b and coils 12, 13 form a first movable member.

As can be clearly seen in FIG. 9, lens holder 11 is formed in a substantially cylindrical piston shape so as to be slidably received by a cylindrical guide hole 16 in cylindrical guide member 114. Cylindrical guide member 114 is a second movable portion. The first movable portion is constrained from moving in any direction other than vertical by the sliding engagement of the downwardly projecting piston of lens holder 11 and hole 16 of guide 114.

The movement of guide 114 in the tracking direction is controlled by arm plates 115, 115'. Arm plate 115 is rotatably coupled to the underside of cylindrical guide member 114 at a connection point 24 (FIG. 11). The other end of guide arm 115 is coupled to the bottom surface of a base plate 116 at a connection point 118. Arm plate 115 is rotably coupled to cylindrical guide member 114 and base plate 116 so that arm plate 115 can rotate about connection points 24 and 118. Connectors such as rivets or screws, for example may be used to allow rotational movement at connection points 24 and 118. One end of a second arm plate 115' is rotatably connected to the bottom surface of cylindrical guide member 114 at a connection point 23 which is positioned diagonally opposite from connection point 24 on the bottom surface of cylindrical guide member 114. The other end of arm plate 115' is rotatably coupled to connection point 117 on the underside of base plate 116. Arm plates 115, 115' thus freely rotate around fixed connection points 118 and 117, respectively. As a result, cylindrical guide member 114 is moved in a substantially horizontal direction as shown in FIG. 11 by arrow 25—25'. Point 25 represents the center of objective lens 10. Arrow 25—25' shows the movement of the center of objective lens 10 as a force is applied by the magnetic circuit resulting from current $i_T$ through coil 13.

Arm plates 115, 115' may be curved members. The movement of second movable portion 114 is still substantially linear as with straight arm plates.

Two elastic bodies 122, 122' are bonded to arms 11a, 11b, respectively of objective lens holder 11 to constrain the range of movement of cylindrical guide member 114, and objective lens 10 which moves with cylindrical guide member 114. Elastic members 122, 122' are constructed of elastic material such as silicon rubber and are bonded by sealing or caulking, for example, to arms 11a, 11b. Elastic bodies 122, 122' establish a neutral point by biasing objective lens 10 at the center of the range of motion in the tracking and focusing directions. They also serve as a damper of vibration to adjust the frequency characteristics of the vibration of the objective lens movement. Accordingly, by proper selection of the material of construction, length, width, shape, hardness and other suitable features of elastic bodies 122, 122', an actuator with an appropriate frequency response can be obtained. As is also evident from FIG. 9, elastic bodies 122, 122' can extend into either or both of the focusing and tracking directions to limit movement in one or both of these directions.

Focusing coil 12 and tracking coil 13 are inserted into the gaps 21 in the magnetic circuits formed by permanent magnets 19, and yokes 20. The gaps 21 are essentially parallel with each other and with sides of focusing coil 12. The four components of the tracking coil 13 are curved at the corners of focusing coil 12. When currents $i_F$ and $i_T$ are applied to focusing coil 12 and tracking coil 13, as shown in FIGS. 7 and 8, the current direction in focusing coil 12 and the effective portions of tracking coils 13 are perpendicular to the magnetic field H (FIG. 9). As a result, in accordance with Flemming's left-hand rule, focusing coil 12 and tracking coil 13 create vertical and horizontal forces, respectively. This produces controllable movement of objective lens 10 both vertically (focusing direction) and horizontally (tracking direction from bottom to top in FIG. 11).

The direction and magnitude of the movement of the first movable portion along a vertical axis and the movement of the second movable portion in a horizontal direction is controlled by the magnitude and direction of the currents $i_F$ and $i_T$. These currents are, for example, irregular alternating currents. The ends of coils 12 and 13 are supported on base plate 116 to provide contacts for applying currents to these coils. As a result, a biaxial actuator adapted to both focus the objective lens along its optical axis and move the objective lens in a radial or tracking direction is achieved. By separate control of movement of the objective lens along a vertical axis and along a horizontal axis, the optical axis of objective lens 10 is prevented from shifting, which shifting introduces aberrations in the optical path.

The objective lens actuator operates to independently move the objective lens along its optical axis and in a direction perpendicular to the optical axis for tracking along the radial direction of a disk 130 (FIG. 11). The movement of objective lens 10 in the focusing direction is powered by the force generated by current flowing through focusing coil 12 and directionally controlled by the sliding interaction of lens holder 11 and guide hole 16 of guide member 114.

The movement of objective lens 10 in the tracking or radial direction is controlled by the second movable portion, including arm plates 115, 115', yoke 20 and base plate 116. Because of the sliding engagement of the first movable portion and second movable portion, the first movable portion, including objective lens 10, moves integrally with guide member 114 in a horizontal direction. The movement of guide member 114 is controlled by the cooperative rotation of arm plates 115 and 115' about fixed points 118 and 117. As clearly depicted in FIG. 11 arm plates 115 and 115' are rotatably coupled to diagonally situated connection points 23, 24 at the bottom of cylindrical guide member 114 and to fixed points 117 and 118. When a horizontal force is applied (when current $i_T$ is introduced to tracking coil 13) the second movable portion moves the center 25 of objective lens 10 toward the center position indicated by reference numeral 25' (FIG. 11) or vice versa.

As can be seen in FIG. 11 the center 25 of objective lens 10 moves along a substantially straight line 25—25'. However, a small degree of rotation of cylindrical guide member 114 is present (the dotted rectangle in FIG. 11). However, objective lens 10 is round and supported in cylindrical guide 114. Therefore, the rotation of cylindrical guide 114 only rotates objective lens 10 about its center, thereby having no effect on the optical path.

The actuator constructed in accordance with the third embodiment of the invention provides accurate crossed biaxial movement of the objective lens required in an objective lens actuator for an optical head. The movement in the tracking or radial direction is close to strictly linear movement and the movable range in the tracking direction is expanded over the available objective lens actuators. In particular, the fluctuation of the optical axis of the reflected light is decreased thereby creating more accurate servo-control over a wider range.

In addition to the improved control of the objective lens the actuator can be made particularly small when assembled which aids in the miniaturization of the optical head. An experimental actuator constructed in accordance with the third embodiment of the invention has been produced which is 25 mm wide, 15 mm deep and 10 mm high. The total thickness of the optical head in which this actuator is used is less than 20 mm. As a result, by using an optical head with an actuator constructed in accordance with this embodiment of the invention a very thin optical memory drive as thin as half the height (42 mm) of the conventional optical head is achieved.

In addition, when a total reflecting mirror is situated underneath the second movable portion (such as mirror 35 in FIG. 4), to reflect the laser beam upward, and the reflecting mirror is moved in parallel with the tracking motion of the objective lens, the laser light passes through the center of the objective lens. As a result, the aberrations in the optical path are substantially eliminated and the optical load on the lens is reduced.

Accordingly, an improved actuator assembly constructed in accordance with the three embodiments of the invention is provided. The objective lens actuators for an optical head in accordance with the invention provide accurate crosed biaxial movement of the objective lens to allow for movement along the optical axis of the objective lens for focusing and parallel to the radial direction of the disks for tracking purposes.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An objective lens actuator for an optical head, the objective lens having an optical axis, said actuator comprising;
   a first movable portion adapted to move the objective lens in the focusing direction along the optical axis, the first movable portion including an objective lens holder with a piston projecting from said objective lens in the direction of the optical axis, said objective lens holder securing the objective lens on the optical axis and supporting a rectangular focusing coil and a four component tracking coil;
   a second movable portion adapted to guide the objective lens in a tracking direction essentially perpendicular to the focusing direction, including a guide hole shaped to slidably receive the first movable portion therein and to restrict movement of the first movable portion relative to the second movable portion to motion substantially along the focusing direction; and
   magnetic circuit means for driving said objective lens in the focusing and tracking directions, said magnetic circuit means including two essentially parallel gaps, portions of said focusing and tracking coils being located in the gaps, respective currents in the focusing and tracking coils causing said first and second movable portions to be urged in the focusing and tracking directions.

2. The actuator of claim 1 wherein the piston projecting from the objective lens in the direction of the optical axis is substantially cylindrical.

3. The actuator of claim 2 wherein the guide hole is substantially cylindrical and shaped to slidably receive the substantially cylindrical piston of the first movable portion.

4. The actuator of claim 3 wherein the four component tracking coil has four substantially rectangular components.

5. The actuator of claim 4 wherein the four substantially rectangular components of the tracking coil are located at the four corners of the rectangular focusing coil.

6. The actuator of claim 1 further comprising a reflecting mirror coupled to the under surface of the second moveable portion.

7. The actuator of claim 6 wherein the reflecting mirror moves along with the objective lens in the tracking direction.

8. The actuator of claim 1 wherein the magnetic circuit means include two permanent magnets and two magnetic yokes, one permanent magnet and one yoke forming the first gap and the second permanent magnet and the second yoke forming the second gap.

9. The actuator of claim 1 further comprising tracking control means for substantially restricting the motion of the second movable portion to the tracking direction.

10. The actuator of claim 9 wherein the tracking control means includes shaft means coupled to the second movable portion for providing at least one rigid shaft extending substantially parallel to the tracking direction and bearing means for slidably receiving the rigid shaft whereby the motion of the second movable portion is substantially restricted to the tracking direction.

11. The actuator of claim 10 wherein the shaft means includes two shafts coupled to the second movable portion and extending substantially parallel to the tracking direction.

12. The actuator of claim 11 wherein the two shafts extend through the second movable portion.

13. The actuator of claim 10 wherein the bearing means includes a block having an opening therein shaped to slidably receive each shaft.

14. The actuator of claim 11 wherein the bearing means includes two bearing blocks each of which has two bearing holes adapted to slidably receive the ends of the two shafts extending from the second movable portion.

15. The actuator of claim 12 wherein the bearing means includes two bearing blocks each of which has two bearing holes adapted to slidably receive the ends of the two shafts extending from the second movable portion.

16. The actuator of claim 13 wherein the bearing block is formed of TEFLON.

17. The actuator of claim 10 wherein the piston projecting from the objective lens in the direction of the optical axis is substantially cylindrical.

18. The actuator of claim 17 wherein the guide hole is substantially cylindrical and shaped to slidably receive the substantially cylindrical piston of the first movable portion.

19. The actuator of claim 10 wherein the four component tracking coil has four substantially rectangular components.

20. The actuator of claim 19 wherein the four substantially rectangular components of the tracking coil are located at the four corners of the rectangular focusing coil.

21. The actuator of claim 10 further comprising a reflecting mirror under the second movable portion.

22. The actuator of claim 21 wherein the reflecting mirror moves along with the objective lens in the tracking direction.

23. The actuator of claim 9 wherein the tracking control means includes two leaf springs, a first end of each of said leaf springs being fixed to spaced locations on the second movable portion, a second end of each of said leaf springs being coupled to the magnetic circuit means, whereby the motion of the second movable portion is substantially restricted to the tracking direction.

24. The actuator of claim 23 wherein the leaf springs are respectively fixed to diagonally opposite sides of the second movable portion.

25. The actuator of claim 23 wherein the magnetic circuit means include two permanent magnets and two magnetic yokes, one permanent magnet and one yoke forming the first gap and the second permanent magnet and the second yoke forming the second gap.

26. The actuator of claim 25 wherein the second end of each of the leaf springs is coupled to one of the yokes.

27. The actuator of claim 23 wherein the piston projecting from the objective lens in the direction of the optical axis is substantially cylindrical.

28. The actuator of claim 27 wherein the guide hole is substantially cylindrical and shaped to slidably receive the substantially cylindrical piston of the first movable portion.

29. The actuator of claim 23 wherein the four component tracking coil has four substantially rectangular components.

30. The actuator of claim 29 wherein the four substantially rectangular components of the tracking coil are located at the four corners of the rectangular focusing coil.

31. The actuator of claim 23 further comprising a reflecting mirror under the second movable portion.

32. The actuator of claim 31 wherein the reflecting mirror moves along with the optical lens in the tracking direction.

33. The actuator of claim 9 wherein said tracking control means includes a base plate facing the bottom of the second movable portion and two arms, a first end of each of said arms being rotatably coupled to connection points on the bottom of said second movable portion, said connection points being spaced diagonally on the bottom of the second movable portion, a second end of each of said arms being rotatably coupled to the base plate, whereby the motion of the second movable portion is substantially restricted to the tracking direction.

34. The actuator of claim 33, wherein the connection points on the bottom of the second movable portion are proximate diagonally opposite corners thereof.

35. The actuator of claim 33 wherein the first movable portion further includes arms extending outward from the piston parallel to the tracking direction.

36. The actuator of claim 35 further comprising biasing means coupled to each of the arms for biasing the second movable portion to a neutral position.

37. The actuator of claim 35 further comprising biasing means coupled to each of the arms for biasing the first and second movable portions to a neutral position.

38. The actuator of claim 36 wherein the biasing means includes two elastic bodies each of the elastic bodies being coupled to one of the arms.

39. The actuator of claim 37 wherein the biasing means includes two elastic bodies each of the elastic bodies being coupled to one of the arms.

40. The actuator of claim 33 wherein the two arms are substantially rectangular members.

41. The actuator of claim 33 wherein the two arms are curved members.

42. The actuator of claim 33 wherein the piston projecting from the objective lens in the direction of the optical axis is substantially cylindrical.

43. The actuator of claim 42 wherein the guide hole is substantially cylindrical and shaped to slidably receive the substantially cylindrical piston of the first movable portion.

44. The actuator of claim 33 wherein the four component tracking coil has four substantially rectangular components.

45. The actuator of claim 44 wherein the four substantially rectangular components of the tracking coil are located at the four corners of the rectangular focusing coil.

46. The actuator of claim 33 further comprising a reflecting mirror under the second movable portion.

47. The actuator of claim 46 wherein the reflecting mirror moves along with the optical lens in the tracking direction.

48. The actuator of claim 33 wherein the magnetic circuit means include two permanent magnets and two magnetic yokes, one permanent magnet and one yoke forming the first gap and the second permanent magnet and second yoke forming the second gap.

49. The actuator of claim 33 wherein the base plate supports the magnetic circuit means.

* * * * *